Figure 12:
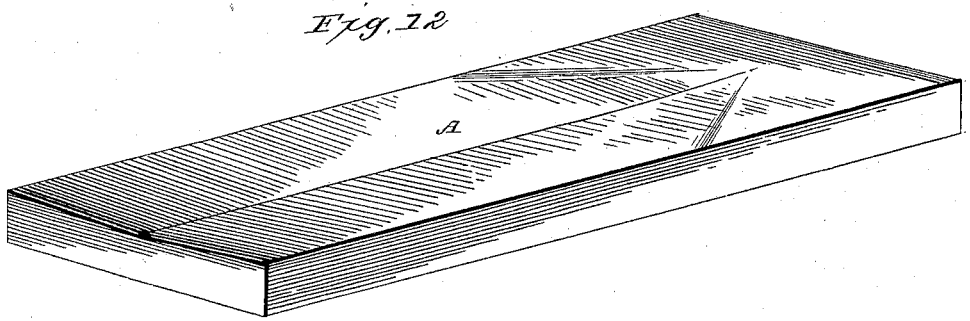

(No Model.) 5 Sheets—Sheet 1.
E. C. STANDIFORD & S. A. HYERS.
TYPE SETTING OR COMPOSING MACHINE.
No. 448,735. Patented Mar. 24, 1891.
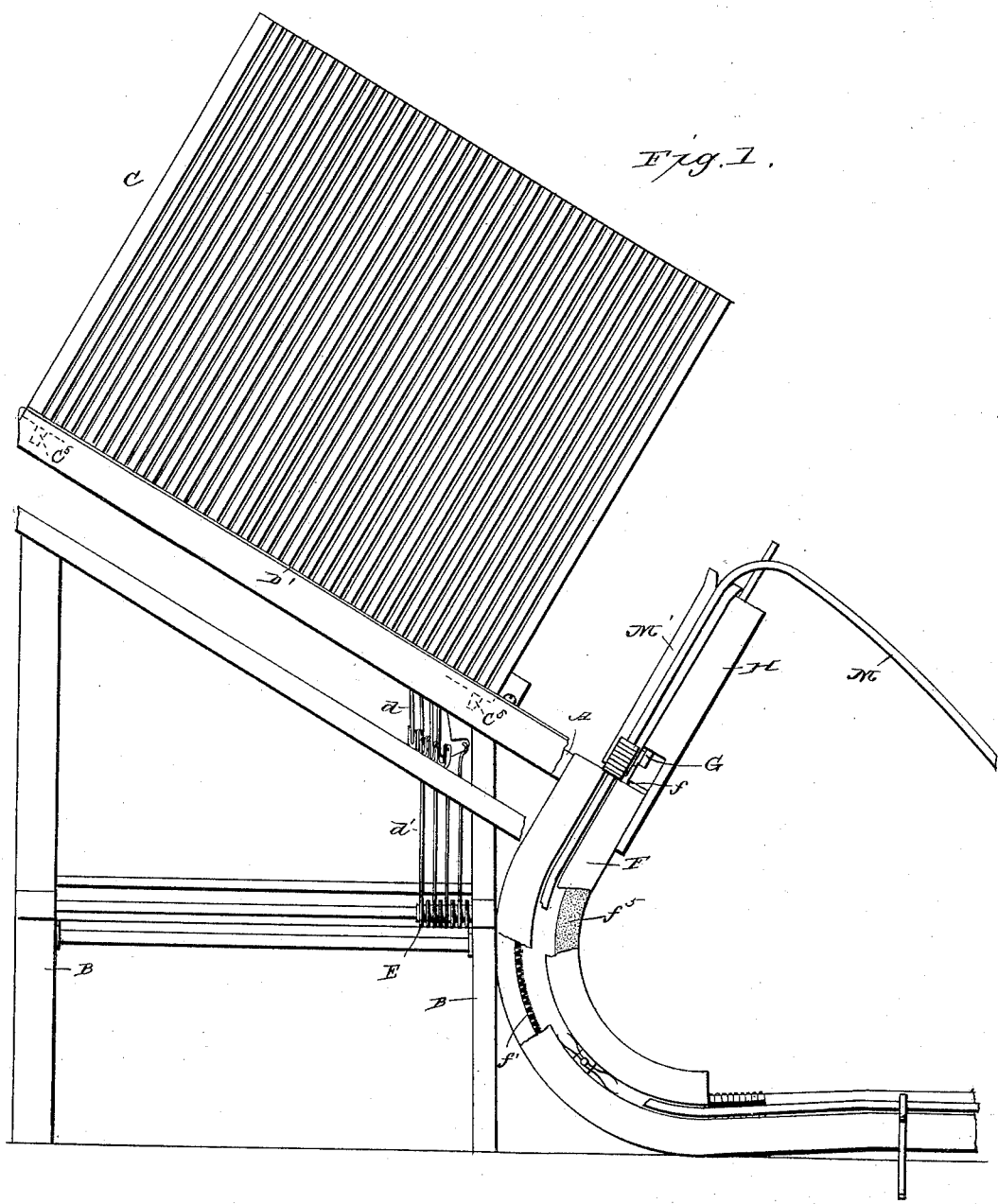

(No Model.) 5 Sheets—Sheet 2.
E. C. STANDIFORD & S. A. HYERS.
TYPE SETTING OR COMPOSING MACHINE.
No. 448,735. Patented Mar. 24, 1891.
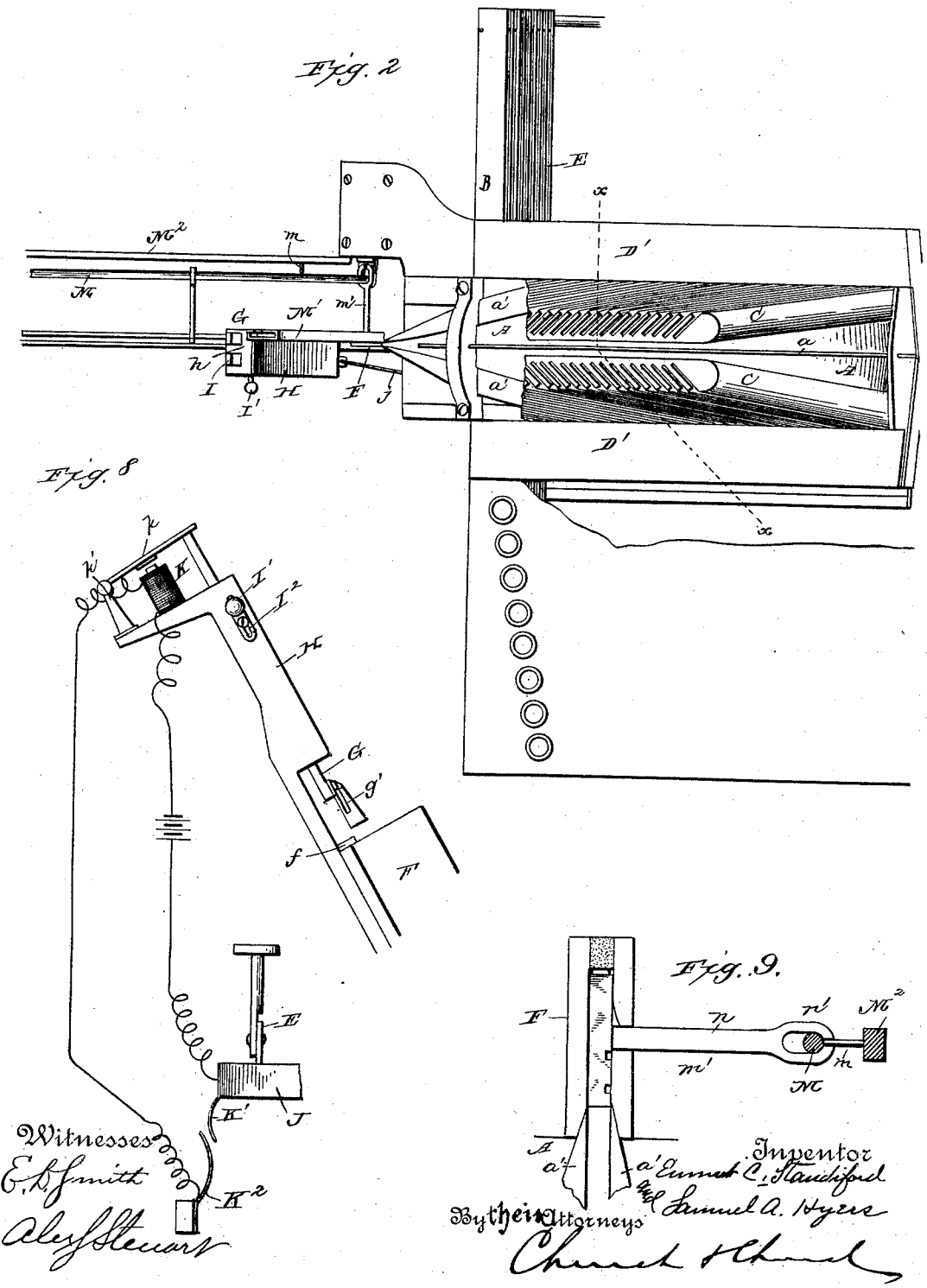

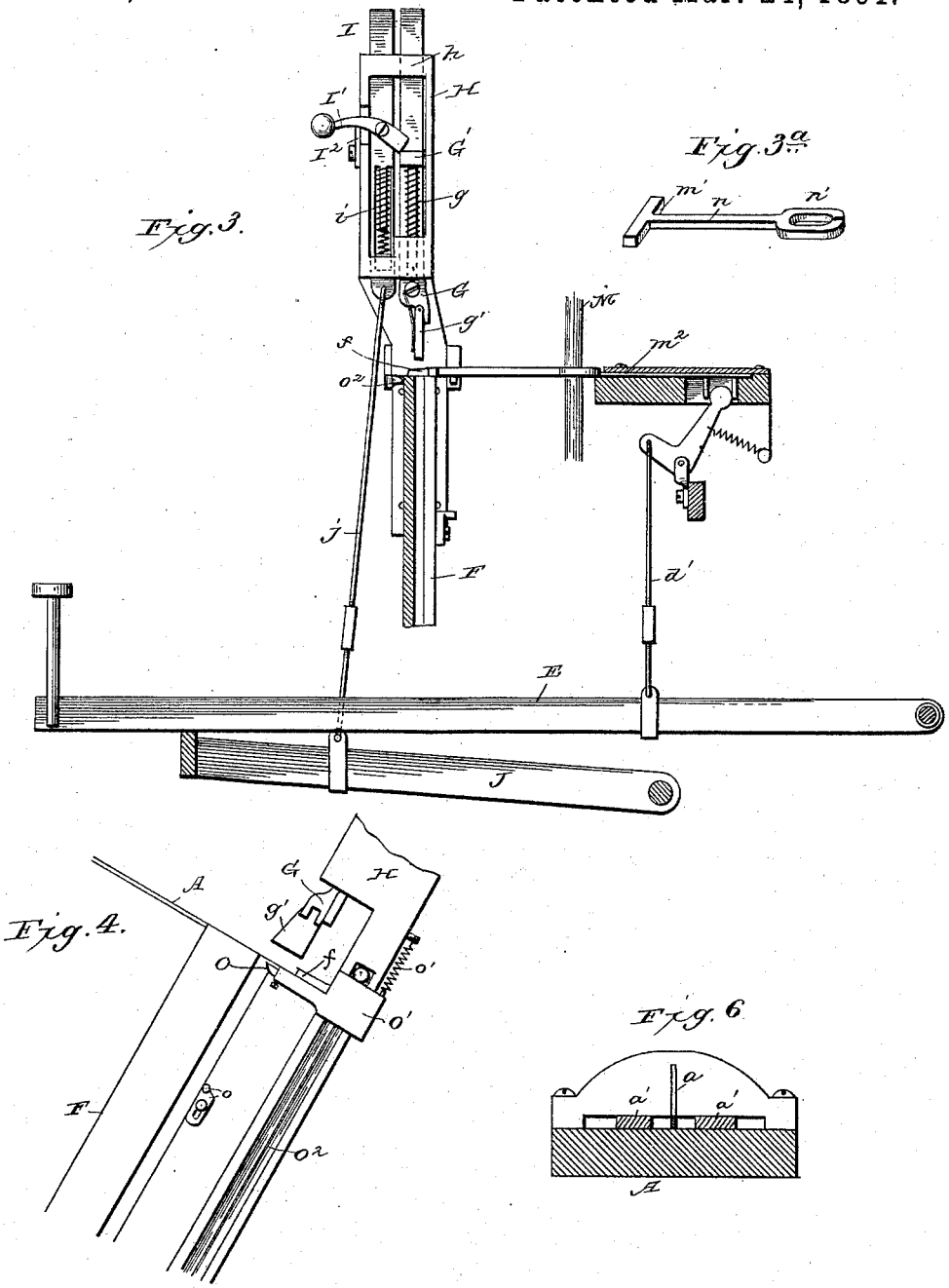

(No Model.) 5 Sheets—Sheet 4.
E. C. STANDIFORD & S. A. HYERS.
TYPE SETTING OR COMPOSING MACHINE.
No. 448,735. Patented Mar. 24, 1891.
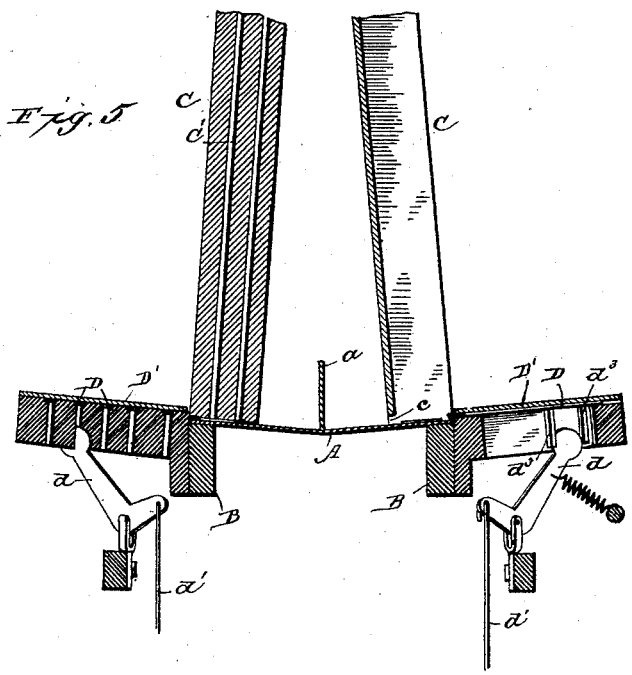
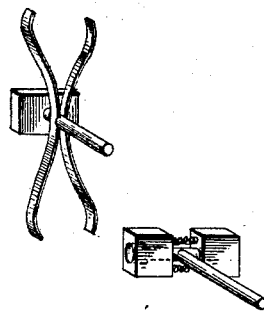
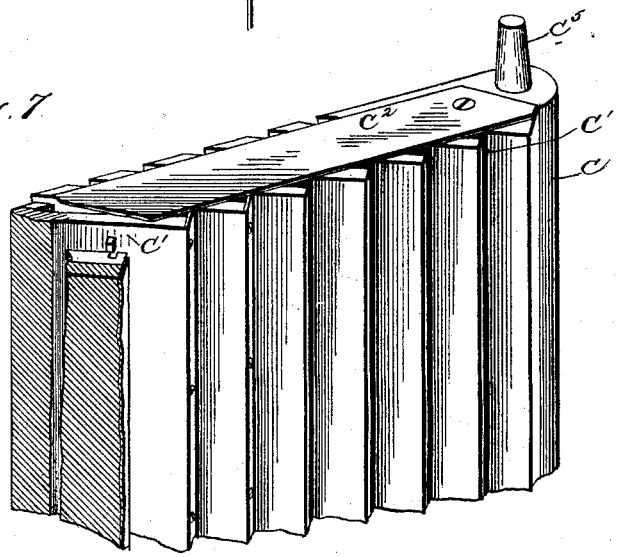

(No Model.) 5 Sheets—Sheet 5.

E. C. STANDIFORD & S. A. HYERS.
TYPE SETTING OR COMPOSING MACHINE.

No. 448,735. Patented Mar. 24, 1891.

Witnesses
E. D. Smith
Aley Stewart

Inventor
Emmet C. Standiford
and Samuel A. Hyers
By their Attorneys

UNITED STATES PATENT OFFICE.

EMMET C. STANDIFORD AND SAMUEL A. HYERS, OF CHICAGO, ILLINOIS.

TYPE SETTING OR COMPOSING MACHINE.

SPECIFICATION forming part of Letters Patent No. 448,735, dated March 24, 1891.

Application filed March 26, 1890. Serial No. 345,345. (No model.)

*To all whom it may concern:*

Be it known that we, EMMET C. STANDIFORD and SAMUEL A. HYERS, both of Chicago, in the county of Cook and State of Illinois, have invented certain new and useful Improvements in Type Setting or Composing Machines; and we do hereby declare the following to be a full, clear, and exact description of the same, reference being had to the accompanying drawings, forming a part of this specification, and to the letters of reference marked thereon.

This invention relates to improvements in that class of machines for composing or setting types in which the types for the different characters are held in separate files or cells and discharged therefrom in proper sequence by suitable keys and complemental connections under the control of the operator, the types so discharged being assembled into lines as they are discharged from the files or cells and presented in convenient position for justification or further manipulation.

The object of the invention is to simplify the construction and operation of the machine and at the same time increase the ease, certainty, and rapidity and correctness of operation.

Broadly stated, the invention consists in arranging the files or cells at the side of an inclined raceway which terminates in a type-channel running at substantially right angles thereto, and in or above which works a packer for forcing the types into the type-channel successively in the order in which they are discharged from the cells, the packing and discharging mechanism for each individual type being controlled by suitable key-levers, preferably arranged in such relation to each other as that each type key-lever when operated causes an operation of the packer, thereby insuring a clear way for the next succeeding type, no matter how rapidly the keys may be operated.

The invention further consists in arranging the files or cells at an angle to the raceway, whereby the type are impelled more or less in their line of travel down the raceway by the action of the discharging mechanism.

It consists, further, in an improved form of type-channel in which the portion immediately adjacent the raceway is preferably straight and at substantially right angles to the raceway, whereby the types are held in the same plane as the raceway and cannot present any obstruction to succeeding type or themselves become caught and jammed, said channel being then curved to the front, so as to bring the types into position for further manipulation, preferably face up.

The invention consists, finally, in certain novel details of construction and combinations and arrangements of parts to be hereinafter described, and pointed out particularly in the claims at the end of this specification.

Figure 13:
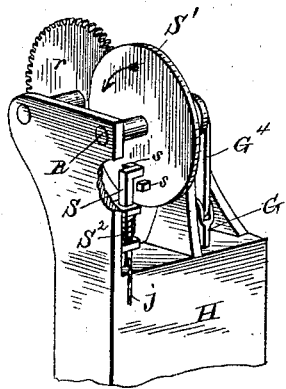
Figure 14:
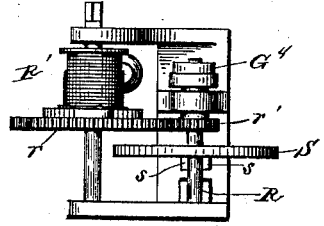

Referring to the accompanying drawings, Figure 1 is a side elevation of so much of the machine as is necesssary for an understanding of the invention. Fig. 2 is a top plan view of the same with the overhanging portion of the files or cells broken away. Fig. 3 is a section taken immediately in front of the packer, showing said packer and the line-space key in elevation. Fig. 3ª is a perspective view of one of the line-spacers. Fig. 4 is a side elevation of the end of the type-channel, showing the line-indicator. Fig. 5 is a section through the files or cells and raceway, taken approximately on the line $x\,x$, Fig. 2. Fig. 6 is a section of the raceway just above the packer and type-channel. Fig. 7 is a perspective view of the bottom of one of the blocks of files. Fig. 8 is a side elevation of a modified form of packer-operating mechanism. Fig. 9 is an enlarged section of the type-channel, showing the position of a type and line spacer therein. Figs. 10 and 11 are perspective views of the retainers preferably employed. Fig. 12 is a perspective view of the raceway. Figs. 13 and 14 are views of another form of packer-operating mechanism.

Similar letters of reference in the several figures indicate the same parts.

Referring particularly to Fig. 1 it will be seen that the raceway A is inclined at an angle of about thirty degrees from the horizontal, being supported in such position by any preferred framing, such as legs and cross-pieces B.

The type files or cells C, of a construction to be hereinafter more particularly described, are mounted at each side of the raceway, preferably resting directly thereon, as shown in Fig. 5, the type being discharged therefrom by plungers D, working in guides beneath the plates D', and operated by bell-crank levers $d$, which engage pins $d^3 d^3$ thereon, and are connected with the key-bars E by means of the links $d'$.

The raceway is, in the preferred construction, depressed slightly at the center, or is of wide V shape in cross-section, with a center partition or rib $a$ to prevent the type from shooting clear across the raceway when they are discharged from the files, as will be readily understood. As the raceway approaches the lower end, it gradually assumes a flat shape, (see Fig. 12,) and at this point side guides $a'$ are provided, which converge toward the bottom, narrowing the raceway down to a single channel immediately below the central partition.

The object in forming the raceway of the construction indicated is to insure the rapid descent of the types and at the same time cause them to assume a position as near as possible directly in line with the discharge-opening and to overcome any tendency the type may have toward working away from the center line, either by reason of the rebound when they are discharged from the cells or from other cause, and also to present the type squarely to the type-channel; and with an idea of further increasing the efficiency of the machine in the direction pointed out the files or cells are arranged at an angle to the raceway—that is to say, they point diagonally downward toward—and the type are discharged as near as possible in the line of the raceway, so that the impetus given the type at the start is added to the force of gravity in causing its rapid descent.

At the bottom or discharge end of the raceway, which is of such width as to permit but one type at a time to pass out, is arranged the type-channel F, preferably at substantially right angles to the bottom of the raceway. Thus the type descending the raceway end first will rest on a suitable retainer or the type already in position without changing its direction of motion at all. In other words, the type will be arrested by the stop $f$ in the same plane which it had previously occupied in coming down the raceway. For a short distance downward the type-channel is straight, and consequently maintains its proper angular position with relation to the raceway, then, as shown clearly in Fig. 1, it curves forward, and finally terminates or assumes an inclination slightly above the horizontal, in order that the type in the lower or forwardly-extending portion of the channel may counterbalance the weight of the type in the upper portion, and thereby prevent their independent downward movement and at the same time require but very little power to advance the whole column within the channel, such upward inclination further preventing any tendency of the type to fall forward.

In the rear side of the type-channel, and preferably at or near the upper end of the curve, is arranged a brush $f'$ or equivalent retainer, which serves as an additional safeguard to prevent the rear end of the type from dropping below the level of the raceway, as would be the case if the curve started at the upper end. The front of the type-channel is preferably of a material which will not wear the face of the type when they strike the stop or when passing around the curve in the channel—such, for instance, as hard rubber, wood, or rawhide, as shown at $f^5$, Fig. 1.

A packer G is arranged immediately over the mouth of the type-channel, preferably working in guides $h$ in an upwardly-extending projection or elongation of the channel H, and has a reciprocating movement of sufficient amplitude to advance the column of type in the channel until the upper surface of the topmost type is at or but very slightly below the level of the raceway.

The operating mechanism for this packer is preferably as follows: In the elongation or extension H are formed bearings at the sides of and similar to the bearings $h$, in which works a reciprocating bar I, elevated by means of a spring $i$, and having a latch or pawl $I'$ pivoted thereon, the shorter and lighter end of which engages the stud or projection $G'$ on the packer, and the longer and heavier end of which engages the adjustable stop $I^2$, the packer itself being elevated by a spring $g$. Now it will be seen that the shorter arm of the latch $I'$ normally lies above the projection $G'$ on the packer, and when the reciprocating bar I is moved downward the packer is moved correspondingly until the longer arm of the latch engages the adjustable stop on the extension H and throws the shorter arm out of engagement with the said projection, permitting the packer to instantly resume its normal position under the influence of its spring $g$. The extent of the movement of the packer may be accurately gaged by means of the adjustable stop $I^2$, and consequently it may be adjusted to carry the packer down to any desired point, either exactly level with the raceway or slightly within the channel.

We prefer to operate the packer directly from the key-levers by means of a frame, which is operated by any one of the series of the key-levers, as shown, for instance, in the drawings, wherein J indicates a frame, which extends beneath all of said levers, and is connected to the lower end of the reciprocating rod I by means of a link $j$, by which arrangement it will be seen that when any one of the key-levers are depressed the initial movement will cause the depression of the packer and its release before the key-lever has advanced far enough to discharge a type into the raceway, the idea being to pack or advance the types previously moved into position in the channel immediately before releasing another type, so that the pause or interval between the depression of one key and the depression of the next succeeding key will be available for permitting a type to slide down the raceway and assume its proper position in the mouth of the type-channel. This mechanical arrangement, while found to be very efficient, is not necessarily employed, as it is obvious that equivalent means may be resorted to to accomplish the end in view, such, for instance, as illustrated in Fig. 8, wherein it will be seen that an electro-magnet K is secured at the upper end of the extension H, and the armature $k$ of said magnet, preferably pivoted at $k'$, bears on the upper end of the reciprocating rod or packer, a simple contact-spring $K'$ being arranged on the frame J in position to make contact with a co-operating stationary spring $K^2$, and so make and break the circuit controlling said magnet to throw the packer into operation at the proper moment; or in lieu of the above-described arrangement the construction shown in Figs. 13 and 14 may be employed, wherein it will be seen that the packer G is connected by a link $G^4$ with a crank-pin on the end of a shaft R, journaled in bearings at the top of the extension H, and rotated by means of the gear-wheel $r$, pinion $r'$, and drum-and-weight connection $R'$. The rotation of the shaft R is controlled by a trip formed by the reciprocating bolt S and the stops $s$ $s$ on the disk $S'$, secured to the shaft R. The bolt S is controlled by the key-levers preferably through the medium of the frame J and link $j'$, the operation being as follows: The weight-and-drum connection constantly tends to rotate the disk and shaft in the direction indicated by the arrow, and the rearward and innermost stop $s$ normally rests against the bolt S, the outer stop $s$ being in advance of the said bolt, whereby when the bolt is depressed by the key-levers it is moved out of the path of the rear stop, the disk and shaft being allowed to revolve until the outer stop comes in contact with the bolt, which movement is sufficient to give substantially a complete reciprocation to the packer. When the bolt resumes its normal position under the influence of the spring $S^2$, it passes out of engagement with the forward stop and into engagement with the rear stop. The advantages of these last packer-operating mechanisms will be seen to lie in the fact that they practically require no extra pressure on the key-levers to operate them.

For the purpose of dividing the column of type assembled in the type-channel into approximate lines a series of line-spacers $m'$ are provided, which are supported on a shelf or rest at one side of the type-channel and adapted to be pushed laterally in under the packer by means of a plunger $m^2$, operated by a special key and connections similar to those described in connection with the type-discharging plungers D. These line-spacers, one of which is shown in perspective, Fig. $3^a$, have a shank $n$ and an elongated split-ring base $n'$, which fits loosely around a guide or rod M, conforming in general shape at the bottom to the shape of the channel and curving over at the top in any preferred manner, as shown, for instance, in Fig. 1.

A hopper $M'$, Figs. 1 and 2, is provided for holding a pile of the line-spacers in position to be advanced beneath the packer, and when so advanced the spacers are packed in a manner similar to an ordinary type, the stem $n'$ passing out through a slot in the side of the type-channel, and the slot in the base permitting the spacers to pass the supports $m$ of the continuous guide M.

As the insertion of the line-spacers depends upon an independent movement by the operator, it is desirable that some provision be made for indicating the number of types which have been carried down into the type-channel since the last spacer was inserted, or, in other words, to indicate an approximate line, and in order to accomplish this result a latch O, Fig. 4, which projects into the path of the spacer-stems, is carried by an indicator-frame $O'$, sliding in bearings $O^2$ in front of the type-channel, said latch being adapted to be tripped by an adjustable stop $o$ when it has been carried by the spacer-stem as far as necessary for a single line, the latch and its frame being then immediately returned to normal position by a very light spring $o'$. An indicator $o^2$, Fig. 3, is connected to the frame $O'$, and passes around in front of the type-channel in convenient position to be seen by the operator.

In order to provide for the insertion of extra wide spaces or for the insertion of a retainer by hand, the end $g'$ of the packer G is pivoted so as to swing to one side when necessary, a light spring serving to return it to normal position.

The files or cells for the types are preferably formed from a single block with the diagonal recesses or cells proper C for the reception of the types themselves milled therein, if desired, the longitudinal aperture at the outside being contracted to prevent the escape of the type after they have been inserted, but at the same time permit a thin instrument to enter for the purpose of dislodging any type which become caught. The number of recesses or cells is gaged by the number of characters it is desired to employ, forty-six on a side being the preferred number. The blocks are removably secured in position upon the raceway, so as to enable different files carrying different styles of type to be used, the escape of the types when the files are so removed being prevented by a bottom plate $C^2$, secured rigidly thereon and made to conform to the raceway either by bringing the plate down to a thin edge or by recessing the raceway for the reception of the plate, as will be readily understood.

The plungers D, it will be noted, are made of a proper width, and the files or cells for the various sizes of the type are so located with relation to each other as that no change is necessary when files or cells for different sizes or styles of type are placed in position.

When in position the bottom of the files or the plate C² rests down flat upon the surface of the raceway. Hence when the types are projected through the apertures c there is no jar or shock, and the liability of turning the type over is reduced to the minimum.

As the bottom type is forced out there is of course more or less friction exerted on the type lying thereon, and in order to prevent the latter from moving forward and crowding into the exit-opening or injuring its face, a pin c' is inserted in one side of each cell C' just above the position occupied by the bottom type, and all the types are formed with a nick or notch to correspond with this pin. Thus the pin sustains the strain on the types and receives all the wear.

The operation is as follows: Assuming that the files or cells have been filled with the proper type, quads, and other signs used in typographical printing and secured firmly in position and that there are no type in the type-channel, the operator inserts a retainer within the channel—such, for instance, as shown in Figs. 10 and 11—having friction pieces or springs at the side, then designates the first character in the line by depressing the key corresponding thereto, the result being that the packer is first operated, pushing the retainer down to a suitable point at or below the plane of the raceway. Then the type bearing the indicated character is shot out of its cell by the plunger and slides rapidly down the raceway to its position in the mouth of the type-channel immediately below the packer and resting on the retainer. When the next character is indicated, the sequence of operation is the same, and so on until the line-indicator which is carried down by the pin or the retainer is released and indicates to the operator that it is time to insert a line-spacer. The key for inserting a line-spacer is then operated and the same manipulations gone through with to produce another line.

It will be here noted that the type are moved down the raceway face first, and consequently when the column in the type-channel has advanced around the curve into the substantially horizontal open portion of the channel they are face up, and the approximate lines being separated by the line-spacers may be inspected, taken out, and justified or otherwise manipulated before being set up or imposed into forms.

When a number of the line-spacers have accumulated at the bottom of the guide M, the operator or an attendant slides them on around the guide and deposits them within the hopper M' in position to be again pushed in beneath the packer, for the purpose before designated.

Each type-setting machine is provided with a number of type files or cases for different sized and styles of type, each having the proper number of cells for the desired number of characters, said cases or files being made removable and interchangeable, thus enabling a single machine to set or compose types of many different sizes and styles. The files or cases are properly positioned and held by taper pins C⁵, and the plungers for discharging the type from individual cells are made narrow enough to fit any of the sizes, it being a simple matter to properly space the cells for any of the sizes.

The preferred form of retainer for the first type inserted in the channel consists of two blocks movably connected together and pressed apart by interposed springs, as shown in Fig. 11, a handle being provided for moving the device along through the channel, when desired.

Having thus described our invention, what we claim as new is—

1. In a machine of the character specified, the combination, with the raceway, type files or cells, and key-levers controlling the discharge of types from said files or cells, of the type-channel for receiving the assembled line, and a reciprocating packer, substantially as described, operated by the key-levers during their downward movements only and making a complete reciprocation during each of said downward movements, whereby the packer is removed from the type-channel before the descent of the type, substantially as described.

2. In a machine of the character specified, the combination, with the inclined raceway, the series of files, and the series of key-levers controlling the discharge of type therefrom, of the type-channel intersecting said raceway and curved forward to present the assembled type in convenient position for further manipulation, and the plunger controlled by the key-levers and working in the mouth of the channel, substantially as described.

3. In a machine of the character specified, the combination, with the raceway, the series of files, and a series of key-levers controlling the discharge of type therefrom, of the type-channel intersecting said raceway at substantially right angles and curving forwardly and upwardly, whereby the weight of the type therein is balanced and the assembled type presented in convenient position for further manipulation, and the packer controlled by the key-levers working in the mouth of said channel.

4. In a machine of the character specified, the combination of the raceway, the series of files, and the series of key-levers controlling the discharge of types therefrom, of the type-channel having the straight portion intersecting the raceway at substantially right angles and the forwardly-curved portion for bringing the assembled types into convenient position for further manipulation, and the packer controlled by the key-levers for advancing the type within the channel, substantially as described.

5. In a machine of the character specified, the combination of the inclined raceway, the series of files, and the series of key-levers controlling the discharge of type therefrom, of the type-channel having the straight portion intersecting the raceway at substantially right angles and the forwardly-curved and upwardly-inclined portion for bringing the assembled types into convenient position for further manipulation and balancing the line and preventing the falling forward of individual types, and the packer controlled by the key-levers for advancing the type within the channel.

6. In a machine of the character specified, the combination of the raceway, the series of files, and series of key-levers for discharging type therefrom, of the type-channel intersecting said raceway and curved toward the front to present the face of the type uppermost, and the retarder for preventing the rear ends of the type from dropping out of line, substantially as described.

7. In a type-setting machine, the combination, with the raceway, the files, key-levers for discharging the type therefrom, and type-channel in which the line is assembled, of a packer working in said channel to advance the line being formed, and connections between said packer and key-levers, whereby the packer is operated by any one of the key-levers, having a trip interposed therein for releasing the packer before the key-lever has completed its movement, substantially as described.

8. In a type-setting machine, the combination, with the raceway, files, the key-levers controlling the discharge of type therefrom, and type-channel, of the packer working in said channel to advance the line being formed, a trip or latch controlled by said key-levers and engaging the packer to depress the same, and a stop for throwing said latch out of engagement at a predetermined moment, substantially as described.

9. In a type-setting machine, the combination, with the raceway, files, key-levers controlling the discharge of types therefrom, and type-channel, of the packer working in said channel to advance the line being formed, a trip or latch controlled by said key-levers and engaging the packer to depress the same, and an adjustable stop for throwing said latch out of engagement at a predetermined moment, substantially as described.

10. In a type-setting machine, the combination, with the raceway, files, key-levers controlling the discharge of type therefrom, and type-channel, of the spring-pressed packer working in said channel to advance the line being formed, a trip or latch controlled by said key-levers to depress the packer against the tension of its spring and advance the line being assembled, and a stop for throwing said latch out of engagement, substantially as described.

11. In a type-setting machine, the combination, with the raceway, files, key-levers controlling the discharge of type therefrom, and type-channel, of the upright guide over said channel, the spring-pressed packer working in said guides, the reciprocating bar controlled by the key-levers, the latch pivoted on said bar and engaging the packer to depress the same, and a stop for releasing said latch, substantially as described.

12. In a type-setting machine, the combination, with the raceway, files, key-levers controlling the discharge of types therefrom, and type-channel, of the two parallel upright guides and bearings over said channel, the spring-pressed packer working in one of said guides, the reciprocating bar controlled by the key-lever working in the other guide, the latch pivoted on said bar and engaging the packer to depress the same, and an adjustable stop for releasing said latch, substantially as described.

13. In a type-setting machine, the combination, with the raceway, files, key-levers controlling the discharge of type therefrom, and type-channel, of the upright guide and bearings over said channel, the spring-pressed packer working in one of said guides, reciprocating bar working in the other guide and having the latch engaging a projection on the packer, a frame extending beneath the key-levers, and a link connecting said frame and reciprocating bar.

14. In a type-setting machine, the combination, with the raceway, files, key-levers controlling the discharge of types therefrom, and type-channel, of the reciprocating packer having the hinged lower end, substantially as and for the purpose set forth.

15. In a type-setting machine, the combination, with the raceway, files, key-levers controlling the discharge of type therefrom, and type-channel, of the spring-pressed reciprocating packer having the hinged spring-pressed lower end and controlled by the key-levers, substantially as and for the purpose set forth.

16. In a type-setting machine, the combination, with the files and mechanism for discharging the types therefrom, of the raceway down which said types are slid, having the depressed central portion, whereby the tendency of the type to work toward the edges is prevented, substantially as described.

17. In a type-setting machine, the combination, with the files and mechanism for discharging the types therefrom, of the raceway down which said types are slid, having the substantially V-shaped upper portion and the flat lower portion, substantially as described.

18. In a type-setting machine, the combination, with the files and mechanism for discharging the types therefrom, of the raceway down which the types are slid, having the depressed center and the central partition or rib, substantially as described.

19. In a type-setting machine, the combination, with the files and the mechanism for discharging the types therefrom, of the raceway down which the types are slid, having the upper centrally-depressed portion and flat lower portion, the central partition, and the converging guides at the lower end, substantially as described.

20. In a type-setting machine, the combination, with the raceway, files, mechanism for discharging the types therefrom, type-channel for receiving said type and packer, of the line-spacers, line-indicator moved thereby, and the stop for releasing said indicator.

21. In a type-setting machine of the character specified, the combination, with the type-channel, packer, and line-spacers, of the movable indicator having the latch engaging said spacers, a stop for tripping said latch at the end of the line, and a spring for returning the indicator to first position.

22. In a type-setting machine of the character specified, the combination, with the type-channel and packer, of the line-spacers and the guide for said spacers conforming to the general shape of the channel, substantially as described.

23. In a type-setting machine of the character specified, the combination, with the type-channel and packer, of the continuous line-spacer guide conforming at the bottom to the general shape of the channel and the line-spacers mounted loosely on said guide.

24. In a type-setting machine, the combination of the raceway, files, mechanism for discharging the types therefrom, and type-channel intersecting said raceway, of the laterally-movable line-spacers, and the plunger and key-lever for moving said line-spacers laterally into position in the mouth of the type-channel, substantially as described.

EMMET C. STANDIFORD.
SAMUEL A. HYERS.

Witnesses:
ALEX. S. STEUART,
A. KELLY.